Oct. 26, 1965 J. DURST 3,213,748
AUTOMATIC FOCUSING ARRANGEMENT FOR ENLARGING APPARATUS
Filed Feb. 12, 1962 2 Sheets-Sheet 1

INVENTOR
Julius Durst
BY Connolly and Hutz
ATTORNEYS

Oct. 26, 1965 J. DURST 3,213,748
AUTOMATIC FOCUSING ARRANGEMENT FOR ENLARGING APPARATUS
Filed Feb. 12, 1962 2 Sheets-Sheet 2

INVENTOR
Julius Durst
BY Connolly and Hutz
ATTORNEYS

United States Patent Office

3,213,748
Patented Oct. 26, 1965

3,213,748
AUTOMATIC FOCUSING ARRANGEMENT FOR ENLARGING APPARATUS
Julius Durst, Brixen, near Bozen, Italy, assignor to Durst A.G. Fabrik Fototechnischer Apparate, Bolzano-Bozen, Germany
Filed Feb. 12, 1962, Ser. No. 172,647
Claims priority, application Italy, Feb. 16, 1961, 2,807/61
5 Claims. (Cl. 88—24)

This invention relates to a photographic enlarging apparatus, and it more particularly relates to such an apparatus which automatically maintains itself in sharp focus over a full operative range of image ratios.

There are existing enlarging apparatus that automatically maintain themselves in sharp focus by adjustment of the objective lens. However when this is accomplished over an operative range including image ratios of 1:1, very complicated and expensive control arrangements are required for moving the objective lens in two different directions. These motion-reversing types of automatic focusing system are therefore too complicated and expensive for widespread usage.

An object of this invention is to provide a simple and economical automatic focusing arrangement for enlarging apparatus.

In accordance with this invention the objective lens of an enlarger is mounted upon a main carrier assembly which is movably mounted upon a support carriage for movement toward and away from the easel. A negative carrier and a control means for adjusting the distance between the objective and negative to sharply focus the apparatus are mounted upon the main carrier assembly. A reference coupling connects the control means to the support carriage for adjusting the control means in accordance with the position of the objective lens relative to the easel to maintain the optical system in sharp focus throughout all image ratios.

Movement may be conveniently imparted to the negative carrier by a counterweight or spring arrangement which biases it toward the main carrier assembly and control means, and it may be conveniently mounted by sliding it upon a rod extending from the main carrier assembly. This arrangement is therefore quite different from the usual mounting of the negative carrier directly upon the main carrier assembly. The light source and condenser lens may be conveniently mounted in a unit within the negative carrier.

The reference coupling between the control means and a fixed portion of the apparatus may be provided by a cable or belt engaged about a pulley connected to operate the control means. In a vertical enlarger this cable can be connected to the top of the main support column upon which the main carriage may be moved either manually or by motor. The control means is conveniently made in the form of a cam and lever reacting against the negative carrier, and the contacting end of the lever may be curved for cooperating with the cam in providing sharp focus for all image ratios. The objective lens and negative carrier may be hinged to the main carrier assembly in a vertical enlarging apparatus to permit its optical axis to be shifted from vertical to horizontal orientations.

Novel features and advantages of the present invention will become apparent to one skilled in the art from a reading of the following description in conjunction with the accompanying drawings wherein similar reference characters refer to similar parts and in which.

Figure 3:
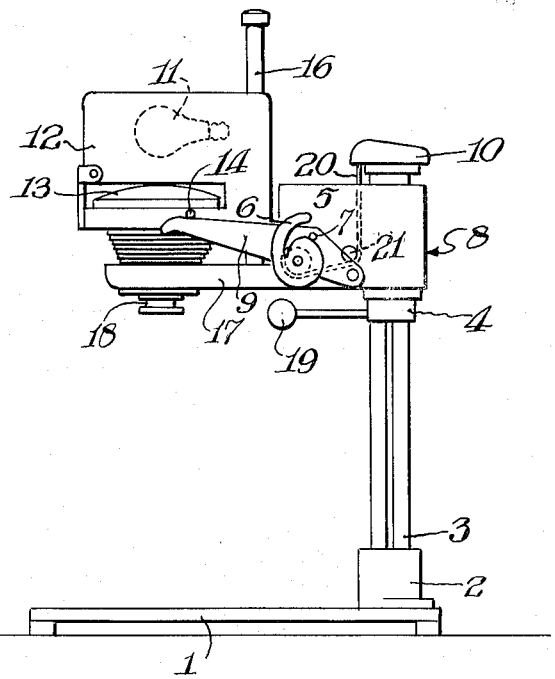
FIG. 3 is a side view in elevation of the apparatus shown in FIG. 1 adjusted to a relatively larger projection distance from objective lens to easel and correspondingly smaller extension from objective lens to negative.
Figure 1:
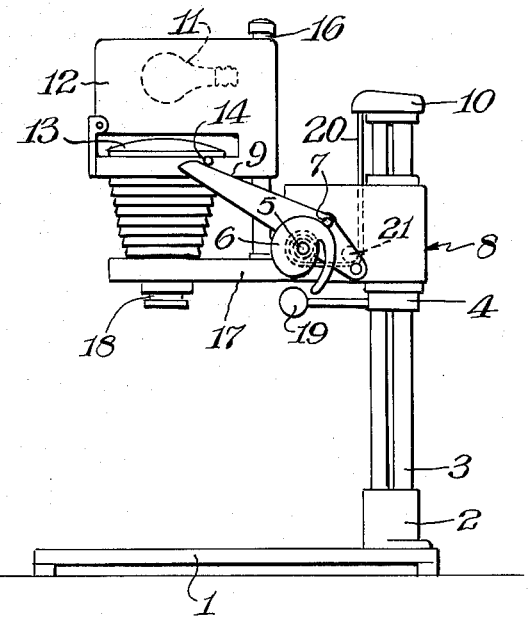
FIG. 1 is a side view in elevation of one embodiment of this invention adjusted to a relatively smaller projection distance from objection lens to easel and a correspondingly larger objective lens to negative distance.

In FIGS 1 and 3 are shown an enlarging apparatus including a combination base and easel 1 upon which is mounted a support carriage in the form of vertical column 3 by means of connection 2. Main carrier assembly 8 is mounted to slide vertically up and down upon colmun 3. Objective lens support 17 is part of main carrier assembly 8, and objective lens 18 is mounted upon the lower side of support 17 facing easel 1. Handle 19 connected to locking ring 4 provides a means for moving main carrier assembly 8 toward and away from base 1 and locking it in position. A control means, including cam 6 mounted upon shaft 5, and lever 9 are rotatably mounted upon main carrier assembly 8. Lever 9 is engaged with cam disc 6 by follower pin or roller 7. The end of lever 9 remote from carrier 8 includes a curved end which reacts against negative carrier 12 through pin or roller 14 mounted upon negative carrier 12 for adjusting its distance from objective lens 18. Negative carrier 12 including light source 11 and condenser lens 13 is movably mounted upon main carriage assembly 8 by connection to objective lens support 17 for movement toward and away from objective lens 18 through a sliding connection to rod 16 extending from objective lens support 17. Cam 6 is connected by a reference coupling to a portion of support carriage 3, for example to the head 10 of column 3, by belt or cable 20 which extends about idler pulley 21 into connection with drive pulley 22 connected to cam shaft 5. This causes the extension from negative to objective lens to be automatically adjusted in accordance with the distance of the objective lens to the easel and thus in accordance with the image ratio. A spring 23 reacts against pulley 22 in a direction to wind cable 20 up upon it.

The curved end of lever 9 reacting against follower roller 14 on negative carrier 12 in conjunction with the shape of cam 6 permits simple and unidirectional movement of the objective lens to generate sharp focusing adjustment of the negative carrier with respect to it throughout all image ratios even through a range including the 1:1 ratio.

Figure 4:
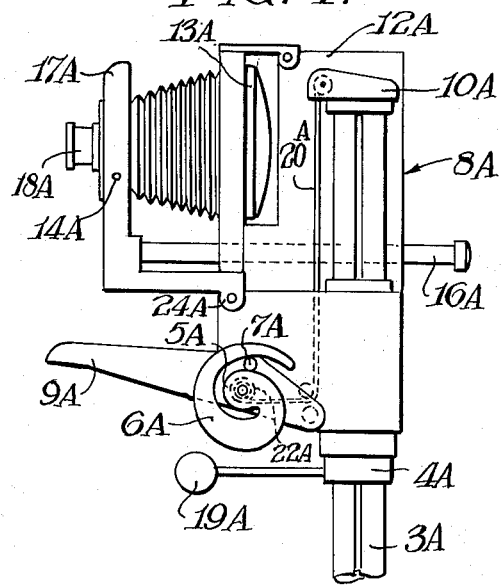
FIG. 4 is a side view in elevation of the apparatus shown in FIG. 2 in the horizontal projection condition.
Figure 6:
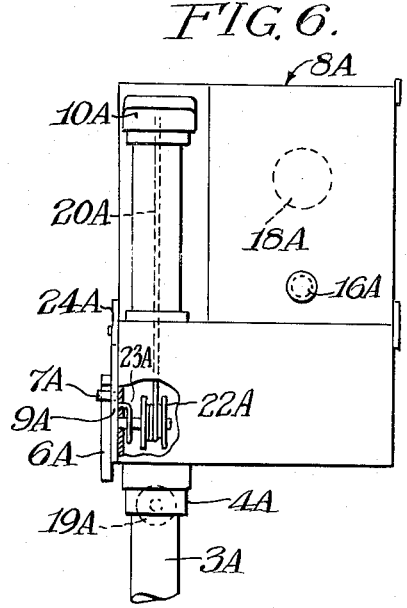
FIG. 6 is a rear view in elevation of the apparatus shown in FIG. 4.
Figure 5:
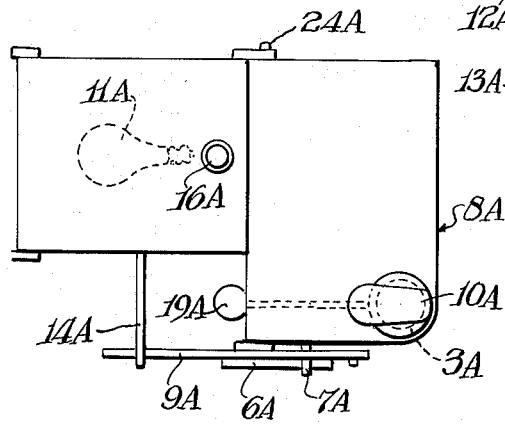
FIG. 5 is a top plan view of the apparatus shown in FIG. 2.
Figure 2:
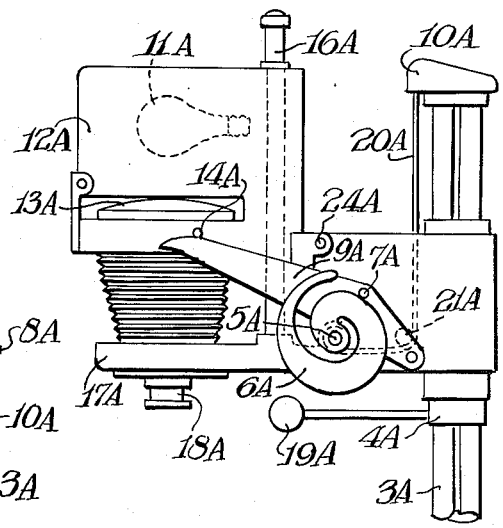
FIG. 2 is a view in elevation of a modification of the apparatus shown in FIG. 1 whose optical axis is movable from vertical to horizontal positions.

FIGS. 2 and 4 describe an apparatus which operates in accordance with the same principle as that of FIGS. 1 and 3 with the exception that objective lens support 17A is rotatably connected about a horizontal axis to main carrier assembly 8 by a hinge 24A. This permits the optical axis of the apparatus to be moved into the horizontal position shown in FIG. 4 in which the automatic focusing control is disengaged to permit manual focusing in that position.

What is claimed is:
1. An automatic focusing arrangement for an enlarging apparatus including a carriage support and an easel comprising a main carrier assembly movably mounted upon said carriage support for movement toward and away from said easel, an objective lens mounted upon said assembly, a negative carrier, movable means mounting said negative carrier upon said assembly for movement toward and away from said objective lens along the optical axis of said enlarging apparatus, control means mounted upon said assembly and reacting against said negative carrier for adjusting the distance between said negative carrier and said objective lens to focus said apparatus, a reference coupling connecting said control means to said carriage support for adjusting said control means in accordance with the position of said assembly relative to said easel whereby said focusing distance of said negative carrier from said objective lens is automatically adjusted, and said control means comprising disk, cam and follower means for adjusting said negative carrier to the proper distance from said objective lens to provide a sharp focus for said apparatus for all positions of said objective lens relative to said easel.

2. An arrangement as set forth in claim 1 wherein said follower being mounted upon a lever which is rotatably mounted upon said assembly, said carriage support comprising a substantially vertical column, said carrier assembly being mounted to slide up and down upon said column, the end of said lever remote from said assembly contacting said negative carrier for adjusting its distance from said objective lens and the weight of said negative carrier maintaining said follower in contact with said cam.

3. An arrangement as set forth in claim 2 wherein the end of said lever which contacts said negative carrier is curved to cooperate with the form of said cam in providing sharp focus throughout the entire operating range of said apparatus.

4. An arrangement as set forth in claim 1 wherein said carriage support comprises a vertical column, and a hinge having a horizontal axis of rotation connecting said objective lens support to said assembly for permitting the optical axis of said objective lens and negative carrier to be rotated from vertical to horizontal positions.

5. An arrangement as set forth in claim 4 wherein said control means includes a lever extending from said assembly which reacts against said negative carrier, and said lever being disengaged from said negative carrier when said negative carrier and objective lens are rotated into the horizontal position.

References Cited by the Examiner

UNITED STATES PATENTS

| 1,252,762 | 1/18 | Young | 88—24 X |
| 1,266,111 | 5/18 | Evans et al. | 88—24 |
| 2,123,510 | 7/38 | Leitz et al. | 88—24 |

FOREIGN PATENTS

| 809,369 | 7/51 | Germany. |
| 698,171 | 10/53 | Great Britain. |
| 509,269 | 1/55 | Italy. |

NORTON ANSHER, *Primary Examiner.*

EMIL G. ANDERSON, EVON C. BLUNK,
*Examiners.*